US012687183B2

(12) United States Patent
Ohira et al.

(10) Patent No.: US 12,687,183 B2
(45) Date of Patent: Jul. 21, 2026

(54) FLUID CONTROLLER

(71) Applicant: KAWASAKI JUKOGYO KABUSHIKI KAISHA, Kobe (JP)

(72) Inventors: Masahiro Ohira, Kobe (JP); Yoshiyuki Tode, Kobe (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 0 days.

(21) Appl. No.: 18/725,910

(22) PCT Filed: Dec. 20, 2022

(86) PCT No.: PCT/JP2022/046831
§ 371 (c)(1),
(2) Date: Jul. 1, 2024

(87) PCT Pub. No.: WO2023/132228
PCT Pub. Date: Jul. 13, 2023

(65) Prior Publication Data

US 2025/0116281 A1 Apr. 10, 2025

(30) Foreign Application Priority Data

Jan. 7, 2022 (JP) ................................ 2022-001648

(51) Int. Cl.
*F15B 13/04* (2006.01)
*F15B 11/042* (2006.01)
(Continued)

(52) U.S. Cl.
CPC ........ *F15B 13/0402* (2013.01); *F15B 11/042* (2013.01); *F15B 11/044* (2013.01);
(Continued)

(58) Field of Classification Search
CPC .. F15B 13/0402; F15B 13/042; F15B 11/042; F15B 11/044; F15B 11/16;
(Continued)

(56) References Cited

U.S. PATENT DOCUMENTS 4,570,672 A * 2/1986 Wilke ................ F15B 13/0402 137/596.13
4,763,691 A * 8/1988 Hahmann ........... F15B 13/0402 91/522

(Continued)

FOREIGN PATENT DOCUMENTS

JP H11-241702 A 9/1999
WO 2022/080311 A1 4/2022

*Primary Examiner* — Dustin T Nguyen
(74) *Attorney, Agent, or Firm* — Oliff PLC

(57) ABSTRACT

A housing includes a spool hole that receives a separated-type spool including a first and a second spool separated from each other in an axial direction of the separated-type spool. The first spool allows a first supply/discharge passage to communicate with either a pump passage or a tank passage. The second spool allows a second supply/discharge passage to communicate with the other pump passage or the tank passage. The housing includes: a first pilot chamber faced by an end surface of an opposite side of the first spool from the second spool; and a second pilot chamber faced by an end surface of an opposite side of the second spool from the first spool. A portion of the spool hole between the first spool and the second spool forms a third pilot chamber. The housing includes a pilot passage that communicates with the third pilot chamber.

10 Claims, 8 Drawing Sheets

(51) Int. Cl.
*F15B 11/044* (2006.01)
*F15B 11/16* (2006.01)
*F15B 13/043* (2006.01)
*F15B 13/042* (2006.01)

(52) U.S. Cl.
CPC .......... *F15B 11/16* (2013.01); *F15B 13/0433* (2013.01); *F15B 13/042* (2013.01); *F15B 2211/30525* (2013.01); *F15B 2211/3057* (2013.01); *F15B 2211/3058* (2013.01); *F15B 2211/329* (2013.01); *F15B 2211/351* (2013.01); *F15B 2211/353* (2013.01); *F15B 2211/405* (2013.01)

(58) Field of Classification Search
CPC .... F15B 2211/30525; F15B 2211/3057; F15B 2211/3058; F15B 2211/329; F15B 2211/351; F15B 2211/353; F15B 2211/405
See application file for complete search history.

(56) References Cited

U.S. PATENT DOCUMENTS

| | | | | | |
|---|---|---|---|---|---|
| 5,183,071 | A * | 2/1993 | Ogawa | F15B 13/01 91/420 |
| 5,579,642 | A * | 12/1996 | Wilke | F15B 11/168 91/518 |
| 5,692,427 | A * | 12/1997 | Yoshida | E02F 9/2271 91/28 |
| 5,791,142 | A * | 8/1998 | Layne | E02F 9/2271 91/446 |
| 5,950,429 | A * | 9/1999 | Hamkins | F15B 11/162 60/426 |
| 6,357,276 | B1 | 3/2002 | Koehler et al. | |
| 7,934,377 | B2 * | 5/2011 | Kim | F15B 21/008 60/469 |
| 9,903,396 | B2 * | 2/2018 | Brinkman | F15B 13/0433 |
| 11,753,801 | B2 * | 9/2023 | Kondo | F15B 20/008 60/459 |
| 2023/0375093 | A1 | 11/2023 | Kondo et al. | |

* cited by examiner

FLUID CONTROLLER

CROSS-REFERENCE TO RELATED APPLICATIONS

This is a U.S. National Phase Application of PCT/JP2022/046831 filed on Dec. 20, 2022, which designates the United States and claims priority to Japanese Patent Application No. 2022-001648, filed on Jan. 7, 2022, the entire contents of which are incorporated herein by reference.

TECHNICAL FIELD

The present disclosure relates to a fluid controller for controlling a fluid supplied from a hydraulic pump to hydraulic actuators.

BACKGROUND ART

Conventionally, a fluid controller for controlling a fluid supplied from a hydraulic pump to hydraulic actuators has been known. For example, the fluid controller includes: spools for the hydraulic actuators, each of which moves bi-directionally in accordance with the supply of the fluid thereto; and a housing including spool holes that receive therein the respective spools.

The housing includes a pump passage and a tank passage in addition to the spool holes, and also includes, for each of the spools, a first supply/discharge passage and a second supply/discharge passage. When each spool is in its neutral position, the first supply/discharge passage and the second supply/discharge passage are blocked from the pump passage and the tank passage, whereas when each spool moves from the neutral position, one of the first supply/discharge passage or the second supply/discharge passage is brought into communication with the pump passage, and the other one of the first supply/discharge passage or the second supply/discharge passage is brought into communication with the tank passage.

CITATION LIST

Patent Literature

PTL 1: Japanese Laid-Open Patent Application Publication No. H11-241702

SUMMARY OF INVENTION

Technical Problem

Regarding a hydraulic actuator that moves bi-directionally in accordance with the supply of the fluid thereto, whichever direction the hydraulic actuator moves in, there is a desire to perform independent metering control on the meter-in side or the meter-out side. For example, Patent Literature 1 discloses an independent metering valve to realize such independent metering control.

To be more specific, as shown in FIG. 8, an independent metering valve 100 disclosed in Patent Literature 1 includes a pump port 101, a pair of supply/discharge ports 102 and 103, and a tank port 104. Further, the independent metering valve 100 includes: a first spool 130, which opens and closes between the pump port 101 and the supply/discharge port 102; a second spool 140, which opens and closes between the supply/discharge port 102 and the tank port 104; a third spool 150, which opens and closes between the pump port 101 and the supply/discharge port 103; and a fourth spool 160, which opens and closes between the supply/discharge port 103 and the tank port 104.

Patent Literature 1 mentions "electro-hydraulic displacement control" in relation to the first to fourth spools 130 to 160. This appears to mean that electrical signals are converted into pilot pressures, and the spools are displaced by these pilot pressures. Generally speaking, solenoid proportional valves are used in such a configuration. That is, four solenoid proportional valves are necessary for the independent metering valve 100. These solenoid proportional valves may be incorporated in the independent metering valve 100, or may be connected to the independent metering valve 100 by piping.

Since four spools are used in the independent metering valve 100 of Patent Literature 1, there is a desire to reduce the number of spools. In this respect, it is conceivable to integrate the first spool 130 and the second spool 140 together, and also integrate the third spool 150 and the fourth spool 160 together. Also with such a configuration, the independent metering control is performable. However, the number of necessary solenoid proportional valves remains four.

In view of the above, an object of the present disclosure is to provide a fluid controller that is capable of independent metering control with a reduced number of solenoid proportional valves.

Solution to Problem

The present disclosure provides a fluid controller including: spools for hydraulic actuators, each of which moves bi-directionally in accordance with supply of a fluid thereto; and a housing including: spool holes that receive therein the respective spools; a pump passage; a tank passage; and for each of the spools, a first supply/discharge passage and a second supply/discharge passage. At least one of the spools is a separated-type spool including a first spool and a second spool that are separated apart from each other in an axial direction of the separated-type spool. The spool holes include a particular spool hole that receives therein the separated-type spool. The first spool blocks the first supply/discharge passage from both the pump passage and the tank passage, or allows the first supply/discharge passage to communicate with one of the pump passage or the tank passage. The second spool blocks the second supply/discharge passage from both the pump passage and the tank passage, or allows the second supply/discharge passage to communicate with the other one of the pump passage or the tank passage. The housing includes: a first pilot chamber faced by an end surface of the first spool, the end surface being an end surface of an opposite side of the first spool from the second spool; and a second pilot chamber faced by an end surface of the second spool, the end surface being an end surface of an opposite side of the second spool from the first spool. A portion of the particular spool hole between the first spool and the second spool forms a third pilot chamber. The housing includes a pilot passage that communicates with the third pilot chamber.

Advantageous Effects of Invention

The present disclosure provides a fluid controller that is capable of independent metering control with a reduced number of solenoid proportional valves.

DESCRIPTION OF EMBODIMENTS

Figure 3:
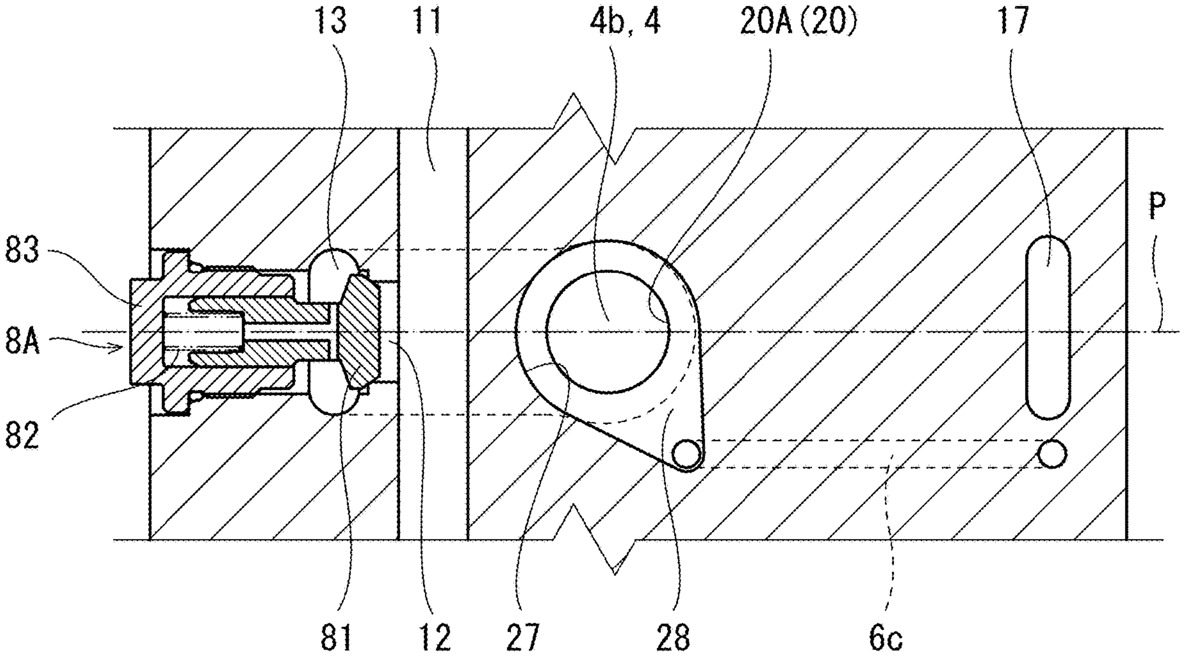
FIG. 3 is a sectional view taken along line III-III of FIG. 2.
Figure 4:
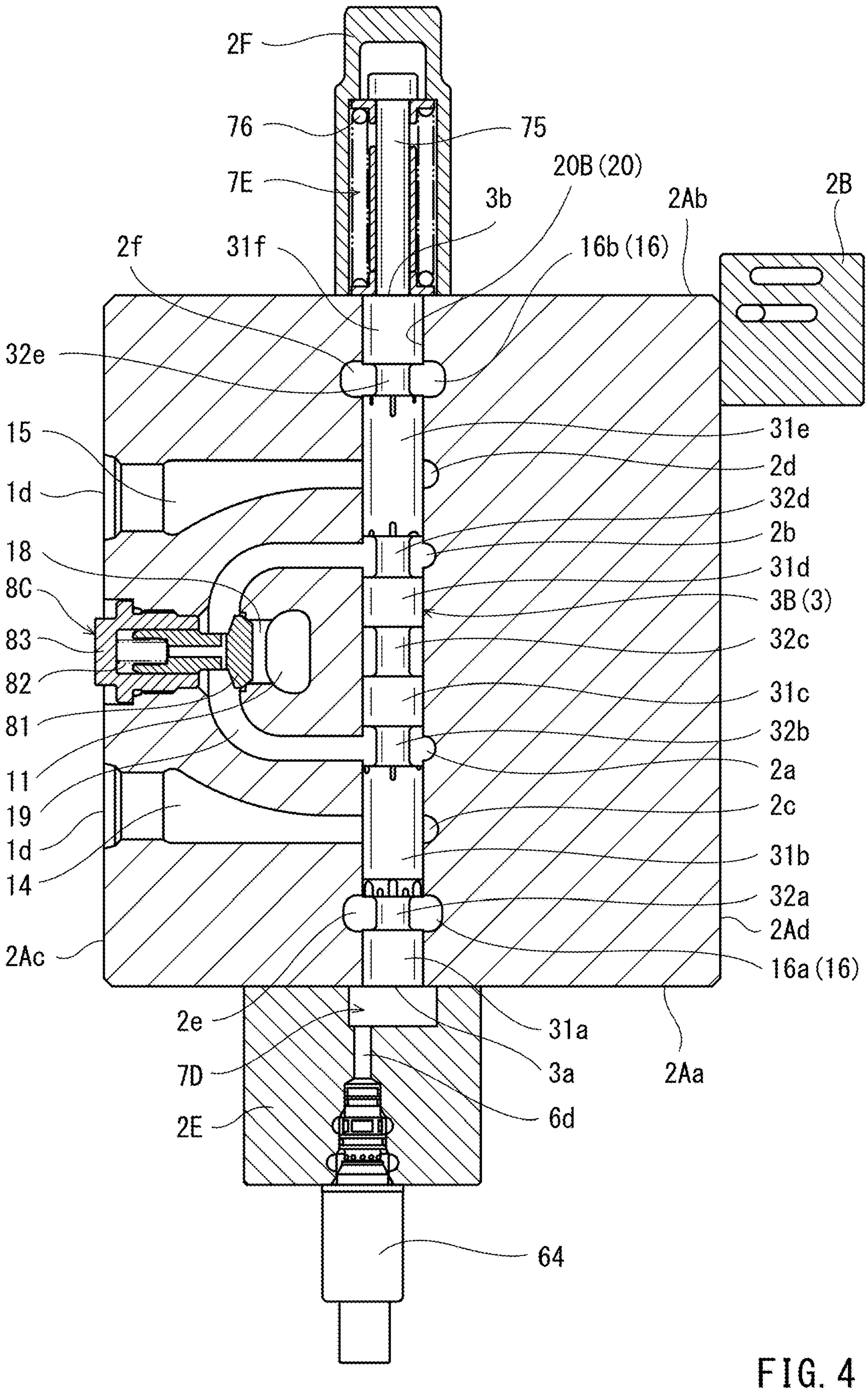
FIG. 4 is a sectional view taken along line IV-IV of FIG. 1.
Figure 5:
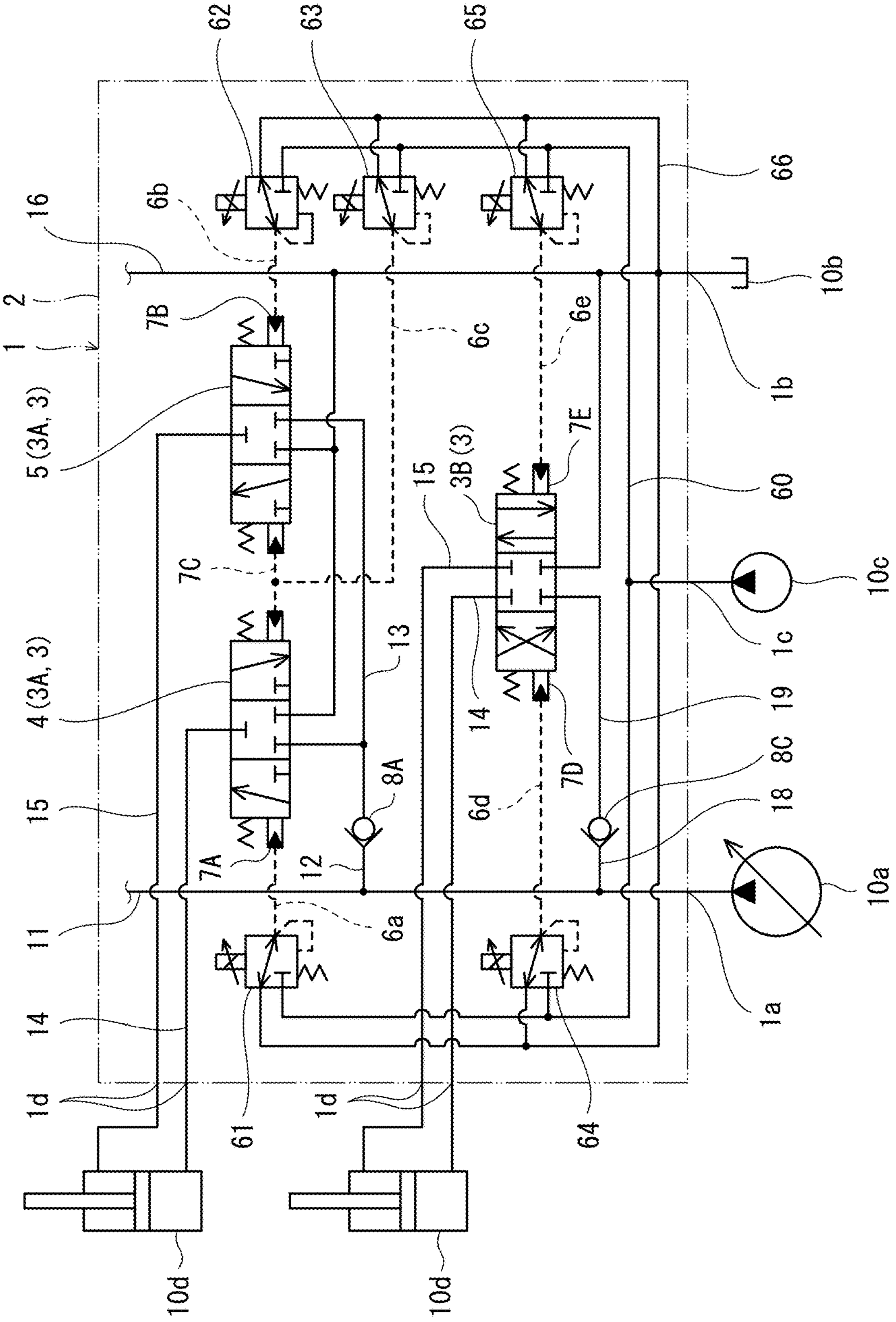
FIG. 5 shows a hydraulic circuit including the fluid controller.

FIG. 1 to FIG. 4 show a fluid controller 1 according to one embodiment, and FIG. 5 shows a hydraulic circuit including the fluid controller 1. The fluid controller 1 is intended for controlling a fluid supplied from a hydraulic pump 10*a* to hydraulic actuators. In the hydraulic circuit, the fluid controller 1 is located between the hydraulic pump 10*a* and the hydraulic actuators. The fluid flowing through the hydraulic circuit is typically oil, but may be a liquid different from oil.

In the present embodiment, all the hydraulic actuators are hydraulic actuators 10*d*, each of which moves bi-directionally in accordance with the supply of the fluid thereto. In FIG. 5, each of the hydraulic actuators 10*d* is a double-acting cylinder. Alternatively, some of or all of the hydraulic actuators 10*d* may each be a hydraulic motor. The hydraulic actuators may include a hydraulic actuator that moves in a single direction in accordance with the supply of the fluid thereto (e.g., a single-acting cylinder).

In the present embodiment, the number of hydraulic actuators 10*d* is five. FIG. 5 only shows two hydraulic actuators 10*d* to simplify the drawing. The number of hydraulic actuators 10*d* is not limited to five, but may be changed as necessary.

The fluid controller 1 includes: spools 3 for the hydraulic actuators 10*d*; and a housing 2, which slidably holds these spools 3. In a case where the hydraulic actuators include a hydraulic actuator that moves in a single direction in accordance with the supply of the fluid thereto, the fluid controller 1 may include, in addition to the spools 3, a spool for the hydraulic actuator that moves in a single direction in accordance with the supply of the fluid thereto. In the present embodiment, the number of spools 3 is the same as the number of hydraulic actuators 10*d*. However, in a case where two hydraulic pumps 10*a* are used, two spools 3 may be used for one hydraulic actuator 10*d*, such that the fluids delivered from the respective hydraulic pumps 10*a* merge together, which is supplied to the hydraulic actuator 10*d*.

The spools 3 are parallel to each other, and are located side by side in a particular direction. In the present embodiment, the spools 3 are located side by side in a line, such that the center lines of all the spools 3 are positioned on the same plane that is parallel to the particular direction. However, it is not essential that the center lines of all the spools 3 be positioned on the same plane that is parallel to the particular direction. Alternatively, the center lines of some of the spools 3 may be positioned away from the plane. Further, the spools 3 located side by side may form two lines.

The housing 2 includes spool holes 20, which receive therein the respective spools 3. That is, the spool holes 20 are also located side by side in the particular direction. The housing 2 further includes: a pump passage 11, which extends in the particular direction; and a tank passage 16. As shown in FIG. 5, the pump passage 11 forms a pump port 1*a* at the surface of the housing 2, and the pump port 1*a* is connected to the hydraulic pump 10*a* by a pump pipe. The tank passage 16 forms a tank port 1*b* at the surface of the housing 2, and the tank port 1*b* is connected to a tank 10*b* by tank pipe.

Figure 2:
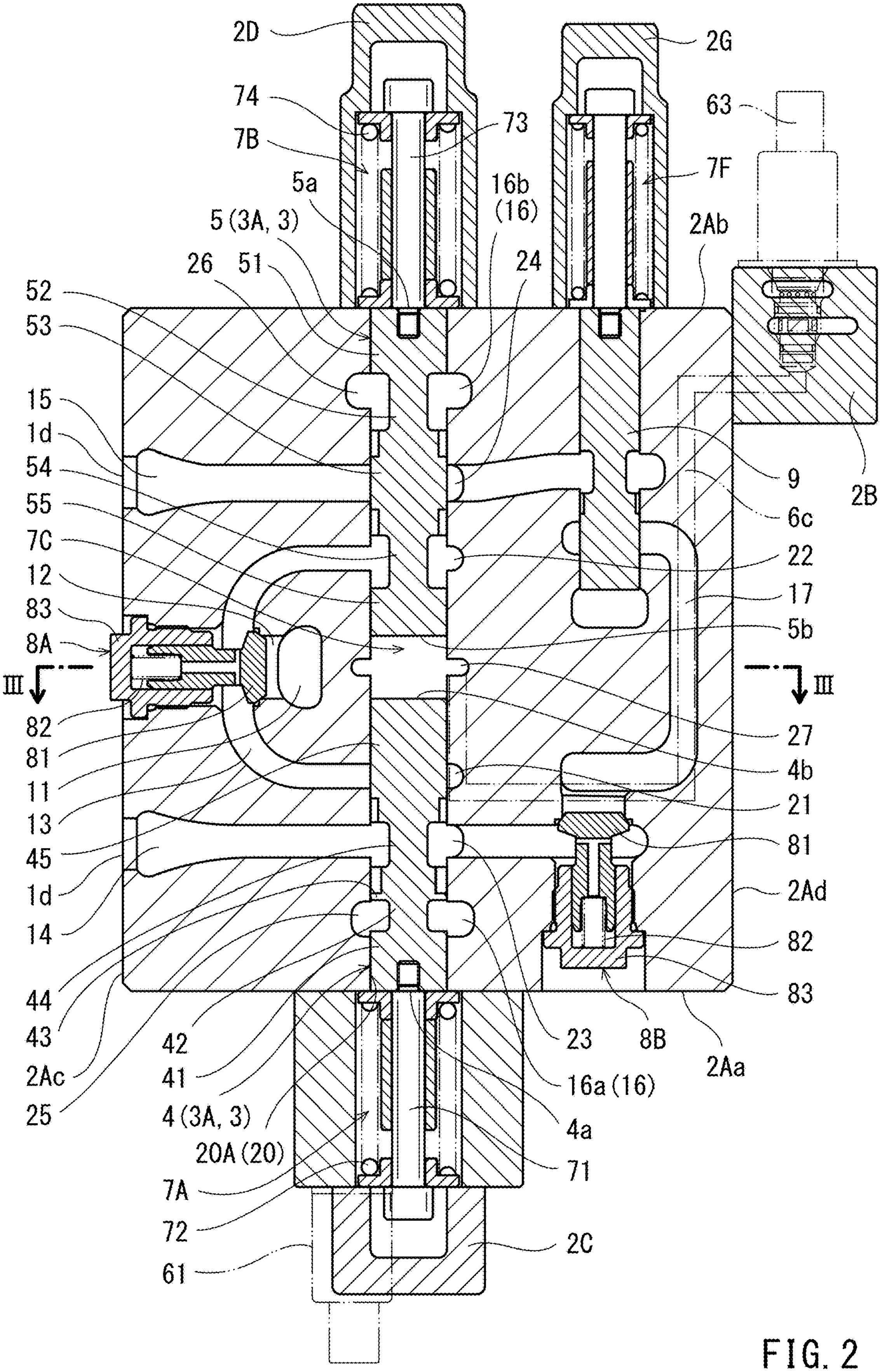
FIG. 2 is a sectional view taken along line II-II of FIG. 1.

As shown in FIG. 2 and FIG. 4, in the present embodiment, the tank passage 16 is branched off within the housing 2 into two branch passages 16*a* and 16*b*, each of which extends in the particular direction. The pump passage 11 passes near the center of each spool 3, and the branch passages 16*a* and 16*b* of the tank passage 16 pass near both ends of each spool 3, respectively. The configurations of the pump passage 11 and the tank passage 16 are modifiable as necessary.

The housing 2 further includes, for each of the spools 3, a first supply/discharge passage 14 and a second supply/discharge passage 15. That is, the number of sets of the first supply/discharge passage 14 and the second supply/discharge passage 15 is the same as the number of spools 3 for the hydraulic actuators 10*d* that move bi-directionally in accordance with the supply of the fluid thereto. The first supply/discharge passage 14 and the second supply/discharge passage 15 form a pair of supply/discharge ports 1*d* at the surface of the housing 2, and these supply/discharge ports 1*d* are connected to the hydraulic actuator 10*d* by a pair of supply/discharge pipes.

In the present embodiment, two spools 3 are separated-type spools 3A shown in FIG. 2, and three spools 3 are integrated-type spools 3B shown in FIG. 4. The integrated-type spools 3B and the separated-type spools 3A are positioned alternately. That is, an integrated-type spool 3B is positioned between separated-type spools 3A.

The arrangement of the integrated-type spools 3B and the separated-type spools 3A is not limited to this example. As another example, the separated-type spools 3A may be adjacent to each other. Further, the ratio of the number of integrated-type spools 3B and the number of separated-type spools 3A is suitably modifiable, so long as the spools 3 include at least one separated-type spool 3A. For example, all of the spools 3 may be separated-type spools 3A.

The housing 2 includes a first pilot chamber 7A, a second pilot chamber 7B, and a third pilot chamber 7C for each separated-type spool 3A, and includes a first pilot chamber 7D and a second pilot chamber 7E for each integrated-type spool 3B.

In the present embodiment, the housing 2 includes: a rectangular-parallelepiped housing body 2A, which extends in the particular direction; and a block 2B, which extends in the particular direction along one side of the housing body 2A. The housing 2 further includes: the same number of first covers 2C and the same number of second covers 2D as the number of separated-type spools 3A; and the same number of first covers 2E and the same number of second covers 2F as the number of integrated-type spools 3B. However, the configuration of the housing 2 is not limited to this example, but is modifiable as necessary. For example, part of the first covers 2C may be integrated with the first covers 2E to form a block that extends in the particular direction.

The housing body 2A includes: a first side surface 2Aa and a second side surface 2Ab, which are orthogonal to the axial direction of each spool 3; and a third side surface 2Ac and a fourth side surface 2Ad, which are parallel to the particular direction and the axial direction of each spool 3. The block 2B is mounted to the fourth side surface 2Ad. The first covers 2C and 2E are mounted to the first side surface 2Aa. The second covers 2D and 2F are mounted to the second side surface 2Ab.

In the present embodiment, the aforementioned pump passage 11 is positioned between the third side surface 2Ac and the spool holes 20, and the aforementioned tank passage 16 is positioned between the fourth side surface 2Ad and the spool holes 20. The pump passage 11 may be branched within the housing 2 into two branch passages, each of which extends in the particular direction. In this case, one branch passage may be positioned between the third side surface 2Ac and the spool holes 20, and the other branch passage may be positioned between the fourth side surface 2Ad and the spool holes 20.

Further, in the present embodiment, the first supply/discharge passages 14 and the second supply/discharge passages 15 for the separated-type spools 3A, and the first supply/discharge passages 14 and the second supply/discharge passages 15 for the integrated-type spools 3B, are positioned between the third side surface 2Ac and the spool holes 20. Alternatively, the first supply/discharge passages 14 and the second supply/discharge passages 15 for the integrated-type spools 3B may be positioned between the fourth side surface 2Ad and the spool holes 20.

Among the spool holes 20, the spool holes 20 that receive therein the respective separated-type spools 3A are particular spool holes 20A, and the spool holes 20 that receive therein the respective integrated-type spools 3B are normal spool holes 20B.

Next, with reference to FIG. 4, the structure surrounding the integrated-type spool 3B and the normal spool hole 20B is described in detail.

The first cover 2E is container-shaped. The first side surface 2Aa of the housing body 2A seals the opening of the first cover 2E, thereby forming the first pilot chamber 7D. Similarly, the second cover 2F is container-shaped. The second side surface 2Ab of the housing body 2A seals the opening of the second cover 2F, thereby forming the second pilot chamber 7E.

The normal spool hole 20B is a through-hole in the housing body 2A, and straddles the first pilot chamber 7D and the second pilot chamber 7E. The integrated-type spool 3B extends in a manner to straddle the first supply/discharge passage 14 and the second supply/discharge passage 15, and includes an end surface 3*a* facing the first pilot chamber 7D and an end surface 3*b* facing the second pilot chamber 7E.

The integrated-type spool 3B shifts among a neutral position, a first position, and a second position. When the integrated-type spool 3B is in the neutral position, the integrated-type spool 3B blocks the first supply/discharge passage 14 and the second supply/discharge passage 15 from both the pump passage 11 and the tank passage 16. When the integrated-type spool 3B is in the first position (the right-side position in FIG. 5), the integrated-type spool 3B allows the first supply/discharge passage 14 to communicate with the pump passage 11, and allows the second supply/discharge passage 15 to communicate with the tank passage 16. When the integrated-type spool 3B is in the second position (the left-side position in FIG. 5), the integrated-type spool 3B allows the first supply/discharge passage 14 to communicate with the tank passage 16, and allows the second supply/discharge passage 15 to communicate with the pump passage 11.

To be more specific, the housing body 2A includes a first flow-in annular groove 2*a*, a second flow-in annular groove 2*b*, a first middle annular groove 2*c*, a second middle annular groove 2*d*, a first flow-out annular groove 2*e*, and a second flow-out annular groove 2*f*, which are recessed radially outward from the normal spool hole 20B. The first flow-in annular groove 2*a*, the first middle annular groove 2*c*, and the first flow-out annular groove 2*e* are located in this order from the middle of the normal spool hole 20B toward the first cover 2E. The second flow-in annular groove 2*b*, the second middle annular groove 2*d*, and the second flow-out annular groove 2*f* are located in this order from the middle of the normal spool hole 20B toward the second cover 2F.

The housing body 2A further includes: a bridge passage 19, which surrounds the pump passage 11 together with the normal spool hole 20B; and a communication hole 18, through which the bridge passage 19 and the pump passage 11 communicate with each other. The communication hole 18 extends from the pump passage 11 in a direction away from the normal spool hole 20B, and connects to the middle of the bridge passage 19.

Both ends of the bridge passage 19 connect to the first flow-in annular groove 2*a* and the second flow-in annular groove 2*b*, respectively. That is, the bridge passage 19 is connected to the normal spool hole 20B via the first flow-in annular groove 2*a* and the second flow-in annular groove 2*b*.

The housing body 2A is mounted with a load check valve 8C, which opens and closes the opening, of the communication hole 18, to the bridge passage 19. The load check valve 8C allows a flow from the pump passage 11 toward the bridge passage 19, but prevents the reverse flow.

Specifically, the load check valve 8C includes: a main structure 83 fixed to the housing body 2A; a valve body 81 slidably held by the main structure 83; and a spring 82 located between the main structure 83 and the valve body 81. Since the structure of the load check valve 8C is known, a further detailed description thereof is omitted herein.

The first supply/discharge passage 14 and the second supply/discharge passage 15 for the integrated-type spool 3B are connected to the first middle annular groove 2*c* and the second middle annular groove 2*d*, respectively. The branch passages 16*a* and 16*b* of the tank passage 16 are connected to the first flow-out annular groove 2*e* and the second flow-out annular groove 2*f*, respectively.

The integrated-type spool 3B includes lands 31*a* to 31*f* and smaller-diameter portions 32*a* to 32*e* located between these lands 31*a* to 31*f*. When the integrated-type spool 3B has shifted from the neutral position toward the first cover 2E, this is the integrated-type spool 3B being in the first position. When the integrated-type spool 3B has shifted from the neutral position toward the second cover 2F, this is the integrated-type spool 3B being in the second position.

In the second pilot chamber 7E, there is a spring 76, which applies to the integrated-type spool 3B urging force to keep the integrated-type spool 3B in the neutral position. The spring 76 directly urges the integrated-type spool 3B toward the first cover 2E via a spring seat. A headed rod 75 is mounted to the end surface 3*b* of the integrated-type spool 3B, and the spring 76 urges the integrated-type spool 3B toward the second cover 2F via a spring seat and the headed rod 75.

In the present embodiment, a first solenoid proportional valve 64 for the first pilot chamber 7D is mounted to the first cover 2E, and a second solenoid proportional valve 65 (see FIG. 1) for the second pilot chamber 7E is mounted to the block 2B. As shown in FIG. 5, the first solenoid proportional valve 64 outputs a secondary pressure to the first pilot chamber 7D through a first pilot passage 6*d*, and the second solenoid proportional valve 65 outputs a secondary pressure to the second pilot chamber 7E through a second pilot passage 6e. In FIG. 4, the illustration of the second pilot passage 6e is omitted for the purpose of simplifying the drawing.

Next, with reference to FIG. 2 and FIG. 3, the structure surrounding the separated-type spools 3A and the particular spool hole 20A is described in detail.

The first cover 2C is container-shaped. The first side surface 2Aa of the housing body 2A seals the opening of the first cover 2C, thereby forming the first pilot chamber 7A. Similarly, the second cover 2D is container-shaped. The second side surface 2Ab of the housing body 2A seals the opening of the second cover 2D, thereby forming the second pilot chamber 7B. In the present embodiment, the first cover 2C is divided into a tubular portion and a covering portion. However, the configuration of the first cover 2C is not limited to this example.

The particular spool hole 20A is a through-hole in the housing body 2A, and straddles the first pilot chamber 7A and the second pilot chamber 7B. The separated-type spool 3A includes a first spool 4 and a second spool 5, which are separated apart from each other in the axial direction of the separated-type spool 3A within the particular spool hole 20A. A portion of the particular spool hole 20A between the first spool 4 and the second spool 5 forms the aforementioned third pilot chamber 7C.

Specifically, an end surface 4a, which is an end surface of the opposite side of the first spool 4 from the second spool 5, faces the first pilot chamber 7A, and an end surface 4b, which is an end surface of the second spool 5 side of the first spool 4, faces the third pilot chamber 7C. Similarly, an end surface 5a, which is an end surface of the opposite side of the second spool 5 from the first spool 4, faces the second pilot chamber 7B, and an end surface 5b, which is an end surface of the first spool 4 side of the second spool 5, faces the third pilot chamber 7C.

The first spool 4 shifts among a neutral position, a first position, and a second position. When the first spool 4 is in the neutral position, the first spool 4 blocks the first supply/discharge passage 14 from both the pump passage 11 and the tank passage 16. When the first spool 4 is in the first position (left-side position in FIG. 5), the first spool 4 allows the first supply/discharge passage 14 to communicate with the pump passage 11 while blocking the first supply/discharge passage 14 from the tank passage 16. When the first spool 4 is in the second position (right-side position in FIG. 5), the first spool 4 allows the first supply/discharge passage 14 to communicate with the tank passage 16 while blocking the first supply/discharge passage 14 from the pump passage 11.

The second spool 5 shifts among a neutral position, a first position, and a second position. When the second spool 5 is in the neutral position, the second spool 5 blocks the second supply/discharge passage 15 from both the pump passage 11 and the tank passage 16. When the second spool 5 is in the first position (right-side position in FIG. 5), the second spool 5 allows the second supply/discharge passage 15 to communicate with the tank passage 16 while blocking the second supply/discharge passage 15 from the pump passage 11. When the second spool 5 is in the second position (left-side position in FIG. 5), the second spool 5 allows the second supply/discharge passage 15 to communicate with the pump passage 11 while blocking the second supply/discharge passage 15 from the tank passage 16.

That is, when both the first spool 4 and the second spool 5 are in the first position or the second position, the first spool 4 allows the first supply/discharge passage 14 to communicate with one of the tank passage 16 or the pump passage 11, and the second spool 5 allows the second supply/discharge passage 15 to communicate with the other one of the tank passage 16 or the pump passage 11.

To be more specific, the housing body 2A includes a first flow-in annular groove 21, a first middle annular groove 23, and a first flow-out annular groove 25, which are located in a region overlapping the first spool 4 and are recessed radially outward from the particular spool hole 20A. The first flow-in annular groove 21, the first middle annular groove 23, and the first flow-out annular groove 25 are located in this order from the middle of the particular spool hole 20A toward the first cover 2C.

The housing body 2A further includes a second flow-in annular groove 22, a second middle annular groove 24, and a second flow-out annular groove 26, which are located in a region overlapping the second spool 5 and are recessed radially outward from the particular spool hole 20A. The second flow-in annular groove 22, the second middle annular groove 24, and the second flow-out annular groove 26 are located in this order from the middle of the particular spool hole 20A toward the second cover 2D.

The housing body 2A further includes: a bridge passage 13, which surrounds the pump passage 11 together with the particular spool hole 20A; and a communication hole 12, through which the bridge passage 13 and the pump passage 11 communicate with each other. The communication hole 12 extends from the pump passage 11 in a direction away from the particular spool hole 20A, and connects to the middle of the bridge passage 13.

Both ends of the bridge passage 13 connect to the first flow-in annular groove 21 and the second flow-in annular groove 22, respectively. That is, the bridge passage 13 is connected to the particular spool hole 20A via the first flow-in annular groove 21 and the second flow-in annular groove 22 on both sides of the third pilot chamber 7C.

The housing body 2A is mounted with a load check valve 8A, which opens and closes the opening, of the communication hole 12, to the bridge passage 13. The load check valve 8A allows a flow from the pump passage 11 toward the bridge passage 13, buts prevents the reverse flow. The structure of the load check valve 8A is the same as the above-described structure of the load check valve 8C.

The first supply/discharge passage 14 and the second supply/discharge passage 15 for the separated-type spool 3A are connected to the first middle annular groove 23 and the second middle annular groove 24, respectively. The branch passages 16a and 16b of the tank passage 16 are connected to the first flow-out annular groove 25 and the second flow-out annular groove 26, respectively.

The first spool 4 includes: a first land 45, which forms the end surface 4b and which opens and closes the first flow-in annular groove 21; a second land 43 positioned between the first middle annular groove 23 and the first flow-out annular groove 25; and a third land 41, which forms the end surface 4a and whose position is shifted toward the outer side of the particular spool hole 20A from the first flow-out annular groove 25. The first spool 4 further includes: a first smaller-diameter portion 44, which couples the first land 45 and the second land 43; and a second smaller-diameter portion 42, which couples the second land 43 and the third land 41. As shown in FIG. 2, when the first spool 4 is in the neutral position, the first flow-in annular groove 21 is in the state of being closed by the first land 45.

When the first spool 4 shifts from the neutral position toward the second spool 5, the first land 45 opens the first flow-in annular groove 21, and the first flow-in annular groove 21 is brought into communication with the first middle annular groove 23. This is the first spool 4 shifting into the first position. On the other hand, when the first spool 4 shifts from the neutral position in a direction away from the second spool 5, the first middle annular groove 23 is brought into communication with the first flow-out annular groove 25. This is the first spool 4 shifting into the second position.

The second spool 5 includes: a first land 55, which forms the end surface 5*b* and whose position is shifted toward the middle of the particular spool hole 20A from the second flow-in annular groove 22; a second land 53, which opens and closes the second middle annular groove 24; and a third land 51, which forms the end surface 5*a* and whose position is shifted toward the outer side of the particular spool hole 20A from the second flow-out annular groove 26. The second spool 5 further includes: a first smaller-diameter portion 54, which couples the first land 55 and the second land 53; and a second smaller-diameter portion 52, which couples the second land 53 and the third land 51. As shown in FIG. 2, when the second spool 5 is in the neutral position, the second middle annular groove 24 is in the state of being closed by the second land 53.

When the second spool 5 shifts from the neutral position toward the first spool 4, the second land 53 opens the second middle annular groove 24, and the second middle annular groove 24 is brought into communication with the second flow-out annular groove 26. This is the second spool 5 shifting into the first position. On the other hand, when the second spool 5 shifts from the neutral position in a direction away from the first spool 4, the second land 53 opens the second middle annular groove 24, and the second middle annular groove 24 is brought into communication with the second flow-in annular groove 22. This is the second spool 5 shifting into the second position.

Figure 1:
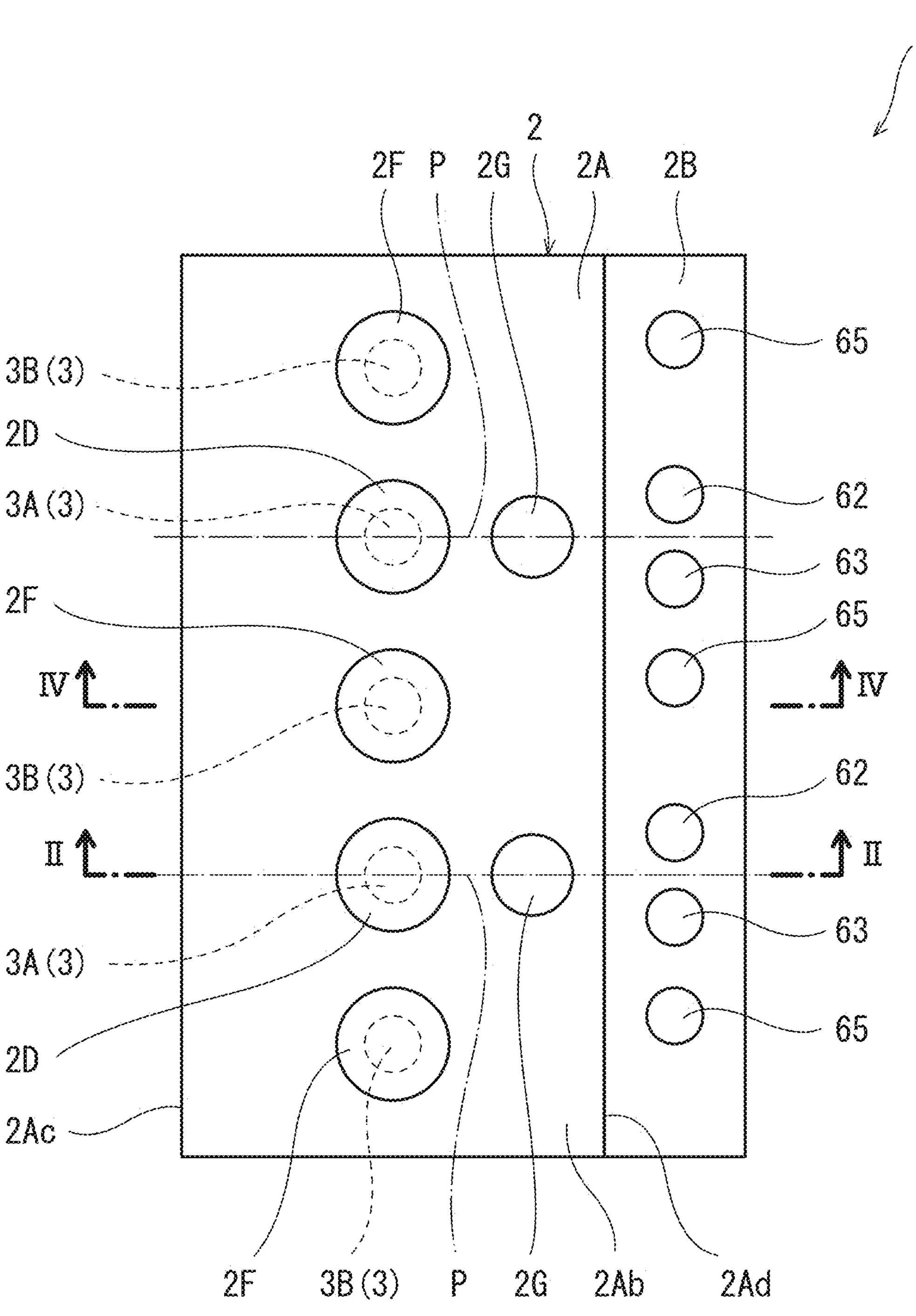
FIG. 1 is a side view of a fluid controller according to one embodiment.

The shapes of the first spool 4 and the second spool 5 shown in FIG. 1 are merely one example. The shapes of the first spool 4 and the second spool 5 are modifiable as necessary. For example, the shape of the first spool 4 and the shape of the second spool 5 may be switched with each other.

In the first pilot chamber 7A, there is a first spring 72, which applies to the first spool 4 urging force to keep the first spool 4 in the neutral position. The first spring 72 directly urges the first spool 4 toward the second spool 5 via a spring seat. A headed rod 71 is mounted to the end surface 4*a* of the first spool 4, and the first spring 72 urges the first spool 4 in a direction away from the second spool 5 via a spring seat and the headed rod 71.

Similarly, in the second pilot chamber 7B, there is a second spring 74, which applies to the second spool 5 urging force to keep the second spool 5 in the neutral position. The second spring 74 directly urges the second spool 5 toward the first spool 4 via a spring seat. A headed rod 73 is mounted to the end surface 5*a* of the second spool 5, and the second spring 74 urges the second spool 5 in a direction away from the first spool 4 via a spring seat and the headed rod 73.

The configuration of the first spring 72 and the configuration of the second spring 74 are the same. That is, the urging force that the first spring 72 applies to the first spool 4, and the urging force that the second spring 74 applies to the second spool 5, are equal to each other.

As shown in FIG. 5, the housing 2 includes: a first pilot passage 6*a*, which communicates with the first pilot chamber 7A; a second pilot passage 6*b*, which communicates with the second pilot chamber 7B; and a third pilot passage 6*c*, which communicates with the third pilot chamber 7C. In FIG. 2, the illustration of the first pilot passage 6*a* and the second pilot passage 6*b* is omitted for the purpose of simplifying the drawing.

In the present embodiment, a first solenoid proportional valve 61, which outputs a secondary pressure to the first pilot chamber 7A through the first pilot passage 6*a*, is mounted to the first cover 2C. A second solenoid proportional valve 62 (see FIG. 1), which outputs a secondary pressure to the second pilot chamber 7B through the second pilot passage 6*b*, is mounted to the block 2B. Also, a third solenoid proportional valve 63, which outputs a secondary pressure to the third pilot chamber 7C through the third pilot passage 6*c*, is mounted to the block 2B. In other words, the third solenoid proportional valve 63 is mounted to the housing 2 at a position that is located on the opposite side of the particular spool hole 20A from the load check valve 8A.

As shown in FIG. 5, the housing 2 includes a primary pressure passage 60, which is connected to the first solenoid proportional valves 61, the second solenoid proportional valves 62, and the third solenoid proportional valve 63 for the separated-type spools 3A, and also connected to the first solenoid proportional valves 64 and the second solenoid proportional valves 65 for the above-described integrated-type spools 3B. The primary pressure passage 60 forms a primary pressure port 1*c* at the surface of the housing 2, and the primary pressure port 1*c* is connected to an auxiliary pump 10*c* by a primary pressure pipe. The housing 2 further includes a tank passage 66, which connects the solenoid proportional valves 61 to 65 to the above-described tank passage 16.

In the present embodiment, as shown in FIG. 1, the third solenoid proportional valve 63 is positioned away from a plane P in the particular direction. The plane P is orthogonal to the particular direction, in which the spools 3 are located side by side, and passes through the center of the particular spool hole 20A. Alternatively, the third solenoid proportional valve 63 may be positioned on the plane P.

In the present embodiment, in a direction orthogonal to both the particular direction and the axial direction of the separated-type spool 3A (i.e., in the left-right direction in FIG. 2), the third pilot passage 6*c* is positioned on the opposite side of the pump passage 11 from the load check valve 8A. Alternatively, in the left-right direction in FIG. 2, the third pilot passage 6*c* and the load check valve 8A may be positioned on the same side as seen from the pump passage 11.

To be more specific, the housing body 2A includes a middle annular groove 27, which is, at a position between the first spool 4 and the second spool 5, recessed radially outward from the particular spool hole 20A. As shown in FIG. 3, the housing body 2A further includes a recess 28, which is continuous with the middle annular groove 27 and which is recessed from the particular spool hole 20A in a manner to have a pointy shape radially outward. The third pilot passage 6*c* is connected to the recess 28. The middle annular groove 27 and the recess 28, together with the aforementioned portion of the particular spool hole 20A between the first spool 4 and the second spool 5, form the third pilot chamber 7C.

In the present embodiment, the direction in which the recess 28 is recessed is, as seen from the center of the particular spool hole 20A, a diagonal direction relative to the aforementioned plane P, the diagonal direction being a direction away from the load check valve 8A. Accordingly, the opening, of the third pilot passage 6*c*, to the third pilot chamber 7C is positioned away from the plane P. Alternatively, the opening, of the third pilot passage 6*c*, to the third pilot chamber 7C may be positioned on the plane P.

In the present embodiment, the third pilot passage 6*c* extends downward from the recess 28 in FIG. 2, then bends to the right in FIG. 2, and thereafter bends upward in FIG. 2. However, the shape of the third pilot passage 6*c* is modifiable as necessary.

In the present embodiment, the housing body 2A further includes a regeneration passage 17 to lead the fluid flowing from the second supply/discharge passage 15 into the particular spool hole 20A to the first supply/discharge passage 14. Alternatively, the regeneration passage 17 may be a passage to lead the fluid flowing from the first supply/discharge passage 14 into the particular spool hole 20A to the second supply/discharge passage 15. The regeneration passage 17 may be eliminated. In FIG. 5, the illustration of the regeneration passage 17 and a configuration related thereto is omitted for the purpose of simplifying the drawing.

The regeneration passage 17 is positioned on the opposite side of the particular spool hole 20A from the load check valve 8A. The regeneration passage 17 extends from the second middle annular groove 24 to the right in FIG. 2, then bends downward in FIG. 2, and thereafter bends to the left in FIG. 2 to connect to the first middle annular groove 23. The third pilot passage 6*c* partly overlaps the regeneration passage 17 as seen in the particular direction. Accordingly, the regeneration passage 17 and the third pilot passage 6*c* can be positioned on the opposite side of the particular spool hole 20A from the load check valve 8A.

The housing body 2A further slidably holds a spool 9, which switches whether to allow or prevent a flow of the fluid through the regeneration passage 17, i.e., switches whether or not to regenerate the fluid. A cover 2G, which forms a pilot chamber 7F to move the spool 9, is mounted to the second side surface 2Ab of the housing body 2A.

The housing body 2A is further mounted with a regeneration valve 8B, which allows the fluid to flow through the regeneration passage 17 only when the pressure in the second supply/discharge passage 15 is higher than the pressure in the first supply/discharge passage 14. The structure of the regeneration valve 8B is the same as the structure of the load check valve 8A or 8C.

As described above, in the fluid controller 1 of the present embodiment, by using the two spools that are the first spool 4 and the second spool 5, the hydraulic actuator 10*d* connected to the first supply/discharge passage 14 and the second supply/discharge passage 15 can be moved bi-directionally. Since the first spool 4 and the second spool 5 are independent of each other, the first spool 4 can be shifted in accordance with a pressure difference between the first pilot chamber 7A and the third pilot chamber 7C, and also, the second spool 5 can be shifted in accordance with a pressure difference between the second pilot chamber 7B and the third pilot chamber 7C. Accordingly, whichever direction the hydraulic actuator 10*d* moves in, independent metering control can be performed on the meter-in side or the meter-out side. Moreover, since the number of pilot chambers is three, a necessary number of solenoid proportional valves can be reduced to three. That is, independent metering control can be performed by using the three solenoid proportional valves for one hydraulic actuator 10*d*.

For example, in a case where the fluid is supplied from the first supply/discharge passage 14 to the hydraulic actuator 10*d* and the fluid is discharged from the hydraulic actuator 10*d* to the second supply/discharge passage 15, in a state where the secondary pressure from the third solenoid proportional valve 63 is zero, i.e., in a state where the fluid is dischargeable from the third pilot chamber 7C to the tank via the third solenoid proportional valve 63, the secondary pressure from the first solenoid proportional valve 61 and the secondary pressure from the second solenoid proportional valve 62 are increased from zero. At the time, if the secondary pressure from the first solenoid proportional valve 61 and the secondary pressure from the second solenoid proportional valve 62 are the same, no independent metering control is performed. However, if the secondary pressure from the first solenoid proportional valve 61 is less than the secondary pressure from the second solenoid proportional valve 62, meter-in control can be performed by the first solenoid proportional valve 61, whereas if the secondary pressure from the second solenoid proportional valve 62 is less than the secondary pressure from the first solenoid proportional valve 61, meter-out control can be performed by the second solenoid proportional valve 62.

On the other hand, in a case where the fluid is supplied from the second supply/discharge passage 15 to the hydraulic actuator 10*d* and the fluid is discharged from the hydraulic actuator 10*d* to the first supply/discharge passage 14, in a state where the secondary pressure from the first solenoid proportional valve 61 and the secondary pressure from the second solenoid proportional valve 62 are zero, i.e., in a state where the fluid is dischargeable from the first pilot chamber 7A to the tank via the first solenoid proportional valve 61 and the fluid is dischargeable from the second pilot chamber 7B to the tank via the second solenoid proportional valve 62, if the secondary pressure from the third solenoid proportional valve 63 is increased from zero, no independent metering control is performed. However, if the secondary pressure from the first solenoid proportional valve 61 is greater than zero, meter-out control can be performed by the first solenoid proportional valve 61, and if the secondary pressure from the second solenoid proportional valve 62 is greater than zero, meter-in control can be performed by the second solenoid proportional valve 62.

In the present embodiment, since the opening, of the third pilot passage 6*c*, to the third pilot chamber 7C is offset from the center of the particular spool hole 20A in the particular direction in which the spools 3 are located side by side, the degree of freedom in the design of the surroundings of the particular spool hole 20A is improved.

Further, in the present embodiment, since the third pilot passage 6*c* is connected to the recess 28, the connection position where the third pilot chamber 7C and the third pilot passage 6*c* are connected can be set to any position. Particularly in a case where the opening of the third pilot passage 6*c* is offset from the center of the particular spool hole 20A in the particular direction in which the spools 3 are located side by side, the opening of the third pilot passage 6*c* can be made greatly offset by the recess 28.

Still further, in the present embodiment, since the third pilot passage 6*c* is positioned on the opposite side of the pump passage 11 from the load check valve 8A, the passages in the housing 2 are prevented from being complex.

Still further, in the present embodiment, the integrated-type spool 3B is positioned between the separated-type spools 3A. In a case where the separated-type spools 3A are adjacent to each other, since three pilot passages and three solenoid proportional valves are necessary for each separated-type spool 3A, it is necessary to densely arrange the pilot passages and the solenoid proportional valves. On the other hand, if the integrated-type spool 3B is positioned between the separated-type spools 3A as in the present embodiment, the arrangement of the pilot passages and the solenoid proportional valves can be made less dense.

Variations

The present disclosure is not limited to the above-described embodiment. Various modifications can be made without departing from the scope of the present disclosure.

For example, the middle annular groove 27 may be eliminated, and the recess 28 may be directly recessed from the particular spool hole 20A. Further, not only the middle annular groove 27, but also the recess 28 may be eliminated, and the third pilot passage 6*c* may be directly connected to the particular spool hole 20A.

Figure 6:
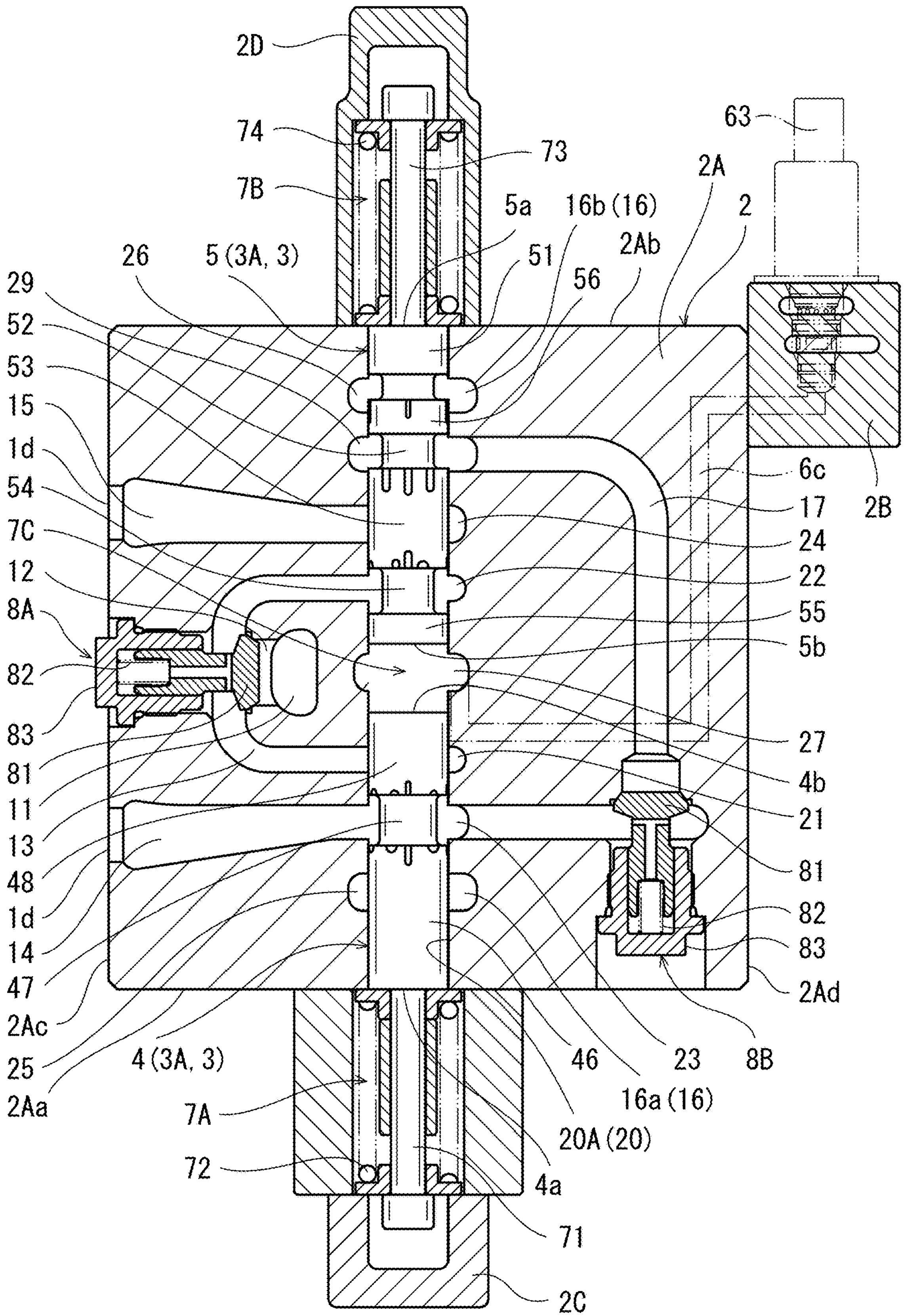
FIG. 6 is a sectional view of a variation of the fluid controller.

A shown FIG. 6, the first spool 4 may include: a first land 48, which forms the end surface 4*b* and which opens and closes the first flow-in annular groove 21; a second land 46, which forms the end surface 4*a* and which opens and closes the first flow-out annular groove 25; and a smaller-diameter portion 47, which couples the first land 48 and the second land 46.

The above-described embodiment adopts the spool 9 to switch whether or not to regenerate the fluid. An alternative configuration as shown in FIG. 6 is also adoptable, such that the regeneration is always performed.

In the example shown in FIG. 6, the housing body 2A includes a regeneration annular groove 29 between the second middle annular groove 24 and the second flow-out annular groove 26. Further, the second smaller-diameter portion 52 of the second spool 5 includes a land 56, which is positioned between the regeneration annular groove 29 and the second flow-out annular groove 26. The upstream end of the regeneration passage 17 is connected to the regeneration annular groove 29. When the second spool 5 shifts toward the first spool 4, the second middle annular groove 24 is brought into communication with the regeneration annular groove 29, and also, the second middle annular groove 24 is brought into communication with the second flow-out annular groove 26 via the regeneration annular groove 29.

Figure 7:
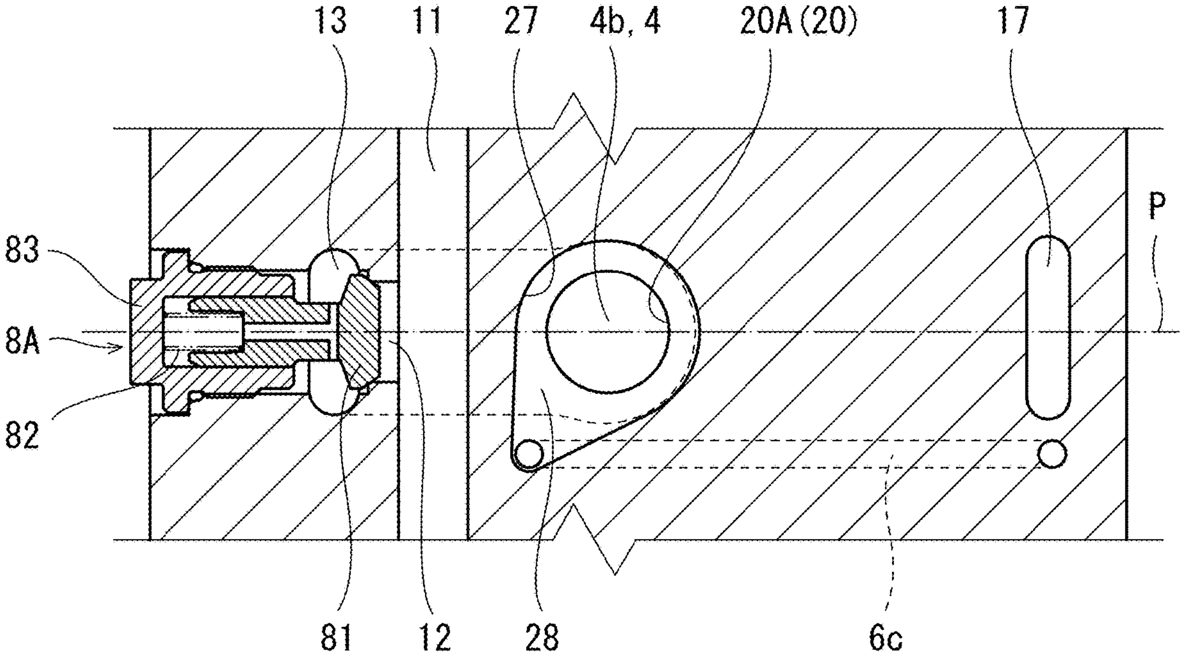
FIG. 7 is a sectional view of another variation of the fluid controller.
Figure 8:
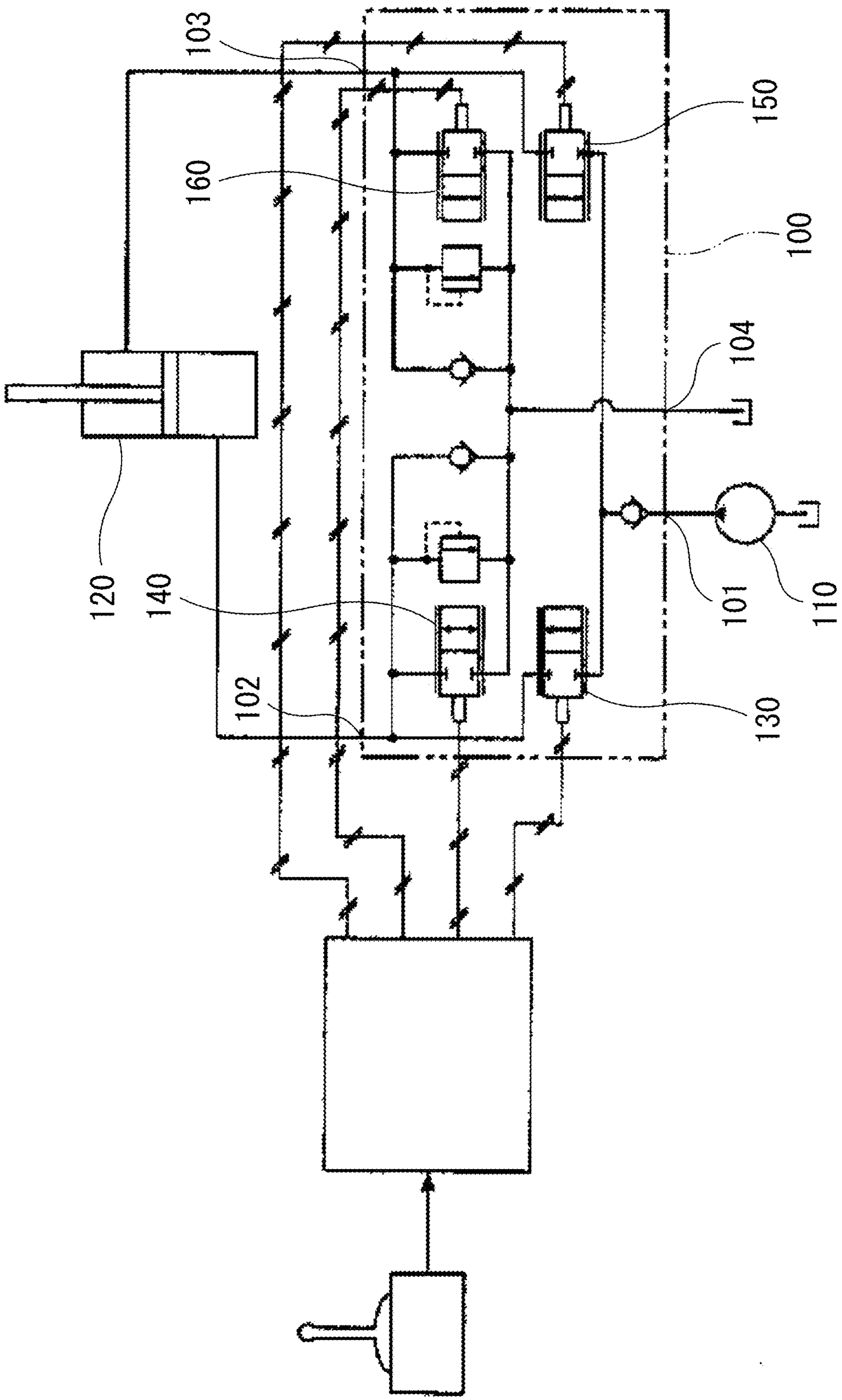
FIG. 8 shows a hydraulic circuit including a conventional fluid controller.

Further, as shown in FIG. 7, the direction in which the recess 28 is recessed may be, as seen from the center of the particular spool hole 20A, a diagonal direction relative to the aforementioned plane P, the diagonal direction being a direction toward the load check valve 8A side.

The load check valve 8A may be eliminated. Regardless of the presence or absence of the load check valve 8A, if, in the direction orthogonal to both the particular direction and the axial direction of the separated-type spool 3A (i.e., in the left-right direction in FIG. 2 or FIG. 6), the third pilot passage 6*c* is positioned on the opposite side of the center of the particular spool hole 20A from the bridge passage 13, the passages in the housing 2 can be advantageously prevented from being complex, similar to the above-described embodiment.

Summary

The present disclosure provides a fluid controller including: spools for hydraulic actuators, each of which moves bi-directionally in accordance with supply of a fluid thereto; and a housing including: spool holes that receive therein the respective spools; a pump passage; a tank passage; and for each of the spools, a first supply/discharge passage and a second supply/discharge passage. At least one of the spools is a separated-type spool including a first spool and a second spool that are separated apart from each other in an axial direction of the separated-type spool. The spool holes include a particular spool hole that receives therein the separated-type spool. The first spool blocks the first supply/discharge passage from both the pump passage and the tank passage, or allows the first supply/discharge passage to communicate with one of the pump passage or the tank passage. The second spool blocks the second supply/discharge passage from both the pump passage and the tank passage, or allows the second supply/discharge passage to communicate with the other one of the pump passage or the tank passage. The housing includes: a first pilot chamber faced by an end surface of the first spool, the end surface being an end surface of an opposite side of the first spool from the second spool; and a second pilot chamber faced by an end surface of the second spool, the end surface being an end surface of an opposite side of the second spool from the first spool. A portion of the particular spool hole between the first spool and the second spool forms a third pilot chamber. The housing includes a pilot passage that communicates with the third pilot chamber.

According to the above configuration, by using the two spools that are the first spool and the second spool, the hydraulic actuator connected to the first supply/discharge passage and the second supply/discharge passage can be moved bi-directionally. Since the first spool and the second spool are independent of each other, the first spool can be shifted in accordance with a pressure difference between the first pilot chamber and the third pilot chamber, and also, the second spool can be shifted in accordance with a pressure difference between the second pilot chamber and the third pilot chamber. Accordingly, whichever direction the hydraulic actuator moves in, independent metering control can be performed on the meter-in side or the meter-out side. Moreover, since the number of pilot chambers is three, a necessary number of solenoid proportional valves can be reduced to three. That is, independent metering control can be performed by using the three solenoid proportional valves for one hydraulic actuator.

The spools may be located side by side in a particular direction. An opening, of the pilot passage, to the third pilot chamber may be positioned away from a plane in the particular direction, the plane being orthogonal to the particular direction and passing through a center of the particular spool hole. According to this configuration, since the opening, of the pilot passage, to the third pilot chamber is offset from the center of the particular spool hole in the particular direction, the degree of freedom in the design of the surroundings of the particular spool hole is improved.

The housing may include a recess that is recessed from the particular spool hole in a manner to have a pointy shape radially outward, and the pilot passage may be connected to the recess. According to this configuration, the connection position where the third pilot chamber and the pilot passage are connected can be set to any position. Particularly in a case where the opening of the pilot passage is offset from the center of the particular spool hole in the particular direction in which the spools are located side by side, the opening of the pilot passage can be made greatly offset by the recess.

The spools may be located side by side in a particular direction. The pump passage may extend in the particular direction. The housing may include: a bridge passage that surrounds the pump passage together with the particular spool hole and that is connected to the particular spool hole on both sides of the third pilot chamber; and a communication hole through which the bridge passage and the pump passage communicate with each other. The fluid controller may include a load check valve that is mounted in the housing and that opens and closes an opening, of the communication hole, to the bridge passage. In a direction orthogonal to both the particular direction and the axial direction of the separated-type spool, the pilot passage may be positioned on an opposite side of the pump passage from the load check valve. According to this configuration, since the pilot passage is positioned on the opposite side of the pump passage from the load check valve, the passages in the housing can be prevented from being complex.

The housing may include a regeneration passage that is positioned on an opposite side of the particular spool hole from the load check valve, the regeneration passage being a passage to lead the fluid flowing from one of the first supply/discharge passage or the second supply/discharge passage into the particular spool hole to the other one of the first supply/discharge passage or the second supply/discharge passage. The pilot passage may overlap the regeneration passage as seen in the particular direction. According to this configuration, the regeneration passage and the pilot passage can be positioned on the opposite side of the particular spool hole from the load check valve.

For example, the above fluid controller may include a solenoid proportional valve that outputs a secondary pressure to the third pilot chamber through the pilot passage, the solenoid proportional valve being mounted to the housing at a position that is located on an opposite side of the particular spool hole from the load check valve.

For example, the above fluid controller may include a solenoid proportional valve that outputs a secondary pressure to the third pilot chamber through the pilot passage, the solenoid proportional valve being mounted to the housing. The solenoid proportional valve may be positioned on a plane that is orthogonal to the particular direction and that passes through a center of the particular spool hole.

For example, the above fluid controller may include a solenoid proportional valve that outputs a secondary pressure to the third pilot chamber through the pilot passage, the solenoid proportional valve being mounted to the housing. The solenoid proportional valve may be positioned away from a plane in the particular direction, the plane being orthogonal to the particular direction and passing through a center of the particular spool hole.

The separated-type spool included in the spools may be a plurality of separated-type spools, and the spools may further include an integrated-type spool that is positioned between the plurality of separated-type spools and that straddles the first supply/discharge passage and the second supply/discharge passage. In a case where the separated-type spools are adjacent to each other, since three pilot passages and three solenoid proportional valves are necessary for each separated-type spool, it is necessary to densely arrange the pilot passages and the solenoid proportional valves. On the other hand, if the integrated-type spool is positioned between the separated-type spools, the arrangement of the pilot passages and the solenoid proportional valves can be made less dense.

The spools may be located side by side in a particular direction. The pump passage may extend in the particular direction. The housing may include: a bridge passage that surrounds the pump passage together with the particular spool hole and that is connected to the particular spool hole on both sides of the third pilot chamber; and a communication hole through which the bridge passage and the pump passage communicate with each other. In a direction orthogonal to both the particular direction and the axial direction of the separated-type spool, the pilot passage may be positioned on an opposite side of a center of the particular spool hole from the bridge passage. According to this configuration, since the pilot passage is positioned on the opposite side of the center of the particular spool hole from the bridge passage, the passages in the housing can be prevented from being complex.

REFERENCE SIGNS LIST

1 fluid controller
10*d* hydraulic actuator
11 pump passage
12 communication hole
13 bridge passage
14 first supply/discharge passage
15 second supply/discharge passage
16 tank passage
17 regeneration passage
2 housing
20 spool hole
20A particular spool hole
20B normal spool hole
28 recess
3 spool
3A separated-type spool
3B integrated-type spool
4 first spool
4*a*, 4*b* end surface
5 second spool
5*a*, 5*b* end surface
61 to 65 solenoid proportional valve
6*a* to 6*c* pilot passage
7A first pilot chamber
7B second pilot chamber
7C third pilot chamber
8A, 8C load check valve

The invention claimed is:

1. A fluid controller for independent metering control, the fluid controller comprising:

spools for hydraulic actuators, wherein each of the hydraulic actuators moves bi-directionally in accordance with supply of a fluid thereto; and a housing including:

spool holes that receive therein the respective spools;

a pump passage;

a tank passage; and for each of the spools, a first supply/discharge passage and a second supply/discharge passage, wherein at least one of the spools is a separated-type spool including a first spool and a second spool that are separated apart from each other in an axial direction of the separated-type spool, the spool holes include a particular spool hole that receives therein the separated-type spool, the first spool blocks the first supply/discharge passage from both the pump passage and the tank passage, or allows the first supply/discharge passage to communicate with one of the pump passage or the tank passage, to control a supply flow rate to or a discharge flow rate from one of the hydraulic actuators, the second spool blocks the second supply/discharge passage from both the pump passage and the tank passage, or allows the second supply/discharge passage to communicate with the other one of the pump passage or the tank passage, to control the supply flow rate to or the discharge flow rate from the one of the hydraulic actuators, the housing includes:

a first pilot chamber faced by an end surface of the first spool, the end surface being an end surface of an opposite side of the first spool from the second spool; and a second pilot chamber faced by an end surface of the second spool, the end surface being an end surface of an opposite side of the second spool from the first spool, a portion of the particular spool hole between the first spool and the second spool forms a third pilot chamber, and the housing includes a pilot passage that communicates with the third pilot chamber, the fluid controller further comprising:

a first solenoid proportional valve that outputs a first pilot pressure to the first pilot chamber;

a second solenoid proportional valve that outputs a second pilot pressure to the second pilot chamber; and a third solenoid proportional valve that outputs a third pilot pressure to the third pilot chamber.

2. The fluid controller according to claim 1, wherein all the spools are located parallel to each other in a particular direction, and an opening, of the pilot passage, to the third pilot chamber is positioned away from a plane in the particular direction, the plane being orthogonal to the particular direction and passing through a center of the particular spool hole.

3. The fluid controller according to claim 1, wherein the housing includes a recess that is recessed from the particular spool hole in a manner to have a pointy shape radially outward, and the pilot passage is connected to the recess.

4. The fluid controller according to claim 1, wherein all the spools are located parallel to each other in a particular direction, the pump passage extends in the particular direction, the housing includes:

a bridge passage that surrounds the pump passage together with the particular spool hole and that is connected to the particular spool hole on both sides of the third pilot chamber; and a communication hole through which the bridge passage and the pump passage communicate with each other, the fluid controller comprises a load check valve that is mounted in the housing and that opens and closes an opening, of the communication hole, to the bridge passage, and in a direction orthogonal to both the particular direction and the axial direction of the separated-type spool, the pilot passage is positioned on an opposite side of the pump passage from the load check valve.

5. The fluid controller according to claim 4, wherein the housing includes a regeneration passage that is positioned on an opposite side of the particular spool hole from the load check valve, the regeneration passage being a passage to lead the fluid flowing from one of the first supply/discharge passage or the second supply/discharge passage into the particular spool hole to the other one of the first supply/discharge passage or the second supply/discharge passage, and the pilot passage overlaps the regeneration passage as seen in the particular direction.

6. The fluid controller according to claim 4, wherein the third solenoid proportional valve is mounted to the housing at a position that is located on an opposite side of the particular spool hole from the load check valve.

7. The fluid controller according to claim 1, wherein the third solenoid proportional valve is mounted to the housing, all the spools are located parallel to each other in a particular direction, and the third solenoid proportional valve is positioned on a plane that is orthogonal to the particular direction and that passes through a center of the particular spool hole.

8. The fluid controller according to claim 1, wherein the third solenoid proportional valve is mounted to the housing, all the spools are located parallel to each other in a particular direction, and the third solenoid proportional valve is positioned away from a plane in the particular direction, the plane being orthogonal to the particular direction and passing through a center of the particular spool hole.

9. The fluid controller according to claim 1, wherein the separated-type spool included in all the spools is a plurality of separated-type spools, and all the spools further include an integrated-type spool that is positioned between the plurality of separated-type spools and that straddles the first supply/discharge passage and the second supply/discharge passage.

10. The fluid controller according to claim 1, wherein all the spools are located parallel to each other in a particular direction, the pump passage extends in the particular direction, the housing includes:

a bridge passage that surrounds the pump passage together with the particular spool hole and that is connected to the particular spool hole on both sides of the third pilot chamber; and a communication hole through which the bridge passage and the pump passage communicate with each other, and in a direction orthogonal to both the particular direction and the axial direction of the separated-type spool, the pilot passage is positioned on an opposite side of a center of the particular spool hole from the bridge passage.

* * * * *